United States Patent [19]
Gourdol

[11] Patent Number: 5,749,070
[45] Date of Patent: May 5, 1998

[54] MULTI-REPRESENTATIONAL DATA STRUCTURE FOR RECOGNITION IN COMPUTER SYSTEMS

[75] Inventor: Arnaud P. J. Gourdol, Cupertino, Calif.

[73] Assignee: Apple Computer, Inc., Cupertino, Calif.

[21] Appl. No.: 833,309

[22] Filed: Apr. 4, 1997

Related U.S. Application Data

[63] Continuation of Ser. No. 120,151, Sep. 9, 1993, abandoned.

[51] Int. Cl.$^6$ ............................................. G10L 5/00
[52] U.S. Cl. ............................................. 704/242; 704/231
[58] Field of Search ........................... 395/2.56, 2.51, 395/2.4; 704/231, 242, 245, 250, 200

[56] References Cited

U.S. PATENT DOCUMENTS

| | | | |
|---|---|---|---|
| 4,654,875 | 3/1987 | Srihari et al. | 382/40 |
| 5,090,012 | 2/1992 | Kajiyama et al. | 370/85.3 |
| 5,157,610 | 10/1992 | Asano et al. | 364/424.03 |
| 5,384,671 | 1/1995 | Fisher | 360/51 |
| 5,463,696 | 10/1995 | Beernink et al. | 382/186 |
| 5,488,727 | 1/1996 | Agrawal et al. | 395/700 |
| 5,500,937 | 3/1996 | Thompson | 395/161 |

*Primary Examiner*—Allen R. MacDonald
*Assistant Examiner*—Richemond Dorvil
*Attorney, Agent, or Firm*—Hickman Beyer & Weaver, LLP

[57] ABSTRACT

An improved recognition data structure is described that is particularly well suited for use in a computer system having recognition abilities. The data structure includes a multi-representational data list section arranged to store a multiplicity of datum. Each datum includes a datum reference number that uniquely identifies that datum and is arranged to contain a plurality of representation zones. Each representation zone is arranged to hold data indicative of a particular representation of the data stored in the datum. The data structure also includes a trellis based recognition results section arranged to accommodate trellis based recognition results at a plurality of different trellis levels.

22 Claims, 8 Drawing Sheets

Figure 9

| | From | To | Label | Probability |
|---|---|---|---|---|
| 201→ | T | 1 | C | |
| 202→ | 1 | 2 | L | |
| 203→ | 2 | 3 | O | |
| 204→ | 3 | ⊥ | G | |
| 205→ | T | 2 | D | |
| 206→ | 1 | 3 | B | |

| Node | Label | Probability |
|---|---|---|
| 1 | C | |
| 2 | D | |
| 3 | L | |
| 4 | O | |
| 5 | B | |
| 6 | G | |

220

*Figure 10*

MULTI-REPRESENTATIONAL DATA STRUCTURE FOR RECOGNITION IN COMPUTER SYSTEMS

This is a continuation, of application Ser. No. 08/120,151 filed Sept. 9, 1993 now abandoned.

BACKGROUND OF THE INVENTION

This invention relates generally to a data structure adapted for use in recognition capable computer systems. More particularly the invention relates to a multirepresentational data structure architecture that is particularly well suited for use with a variety of different application programs and recognition engines.

Graphical user interfaces or GUI are becoming increasingly popular with computer users. It is generally accepted that computers having graphical user interfaces are easier to use, and that it is quicker to learn an application program in a GUI environment than in a non-GUI environment. A relatively new type of computer which is well suited for graphical user environments is the pen-based or pen-aware ("pen") computer system. One common type of pen-based computer system is a small, hand-held computer where the primary method for inputting data includes a "pen" or stylus. Another type of pen-based computer system, often referred to as a pen-aware computer system is one which has been modified to accept pen inputs in addition to traditional input methods.

A pen computer system is often housed in a relatively flat enclosure, and has a dual-function display assembly which serves as both an input device and an output device. When operating as an input device, the display assembly senses the position of the tip of a stylus on the viewing screen and provides this positional information to the computer's central processing unit (CPU). Some display assemblies can also sense the pressure of the stylus on the screen to provide further information to the CPU. When operating as an output device, the display assembly presents computer-generated images on the screen.

The dual-function display assemblies of pen-based computer systems permit users to operate the computer as a computerized notepad. For example, graphical images can be input into the pen-based computer by merely moving the stylus across the surface of the screen. A stroke is defined as the engagement of the screen with a stylus, the movement of the stylus across the screen (if any), and its subsequent disengagement from the screen. As the CPU senses the position and movement of the stylus, it generates a corresponding image on the screen to create the illusion that the stylus is drawing the image directly upon the screen, i.e. that the stylus is "inking" an image on the screen. With suitable recognition software, text and numeric information can also be entered into the pen-based computer system in a similar fashion.

Recognition is the process by which data is transformed from one form into another, more useful form. Handwriting recognition transforms recorded movement of a stylus over a digitizer (i.e. the screen) into a string of text. Similarly, speech recognition transforms recorded sound into a string of text. Typically, recognition within a general computer system involves three actors. They include, a recognition engine, an operating system and application software. The application software uses the operating system to communicate with the recognition engine. Thus, the application is typically independent from a particular recognition engine. The recognition service may thus be shared by multiple applications. In this arrangement, the operating system acts as a mediator finding available recognition engines, allocating the resources necessary to their operation (such as memory, files, etc.) and performing low-level communication with the recognition engine on behalf of the application.

The recognition engine is a component. That is, it is a predefined class of software that can be readily replaced. Accordingly, it is desirable to provide a standardized set of services and interfaces between recognition engines and operating systems. This allows the simultaneous use of a plurality of recognition engines and/or allows a selected recognition engine to be replaced with more accurate and faster versions as they become available without having to change the application. Accordingly, there have been ongoing efforts that attempt to standardize this interface so that a variety of sources can develop recognition engines suitable for use in a variety of environments. FIG. 1 shows a representative recognition architecture in accordance with this described arrangement.

Specifically, an application program 500 communicates bidirectionally with the operating system 502 which communicates bidirectionally with a recognition engine 504 on two different levels. The first level allocates and requests resources and the second level is a low level communication. The communication from the application program to the operating system are primarily in the form of raw data and the communications from the operating system to the application program are primarily in the form of recognized data. The input to the recognition engine is a recognition data list. The recognition data list is a data structure representing a list of data. By way of example, the list of data may entail strokes or speech segments. The output of the recognition engine is a recognition results structure. The object of the present invention is to provide standardized data list and recognition result structures which are particularly well suited for general use in a standardized recognition architecture.

SUMMARY OF THE INVENTION

To achieve the foregoing and other objects and in accordance with the purpose of the present invention, an improved recognition data structure is described that is particularly well suited for use in a computer system having recognition abilities. The data structure includes a multi-representational data list section arranged to store a multiplicity of datum.

Each datum includes a datum reference number that uniquely identifies that datum and is arranged to contain a plurality of representation zones. Each representation zone is arranged to hold data indicative of a particular representation of the data stored in the datum. The data structure also includes a trellis based recognition results section arranged to accommodate trellis based recognition results at a plurality of different trellis levels.

In a preferred embodiment, the trellis based recognition results structure includes one or more arrays which may be used to store recognized information in both link based and node based trellis formats. In a further preferred embodiment, the array further has room to identify the probability of each link or node being correct. In another preferred embodiment, each row of the array includes a pointer that points to a block in memory that stores a block of information that labels the link or node that defines the associated row.

The described data structure is well adapted for use in both handwriting and speech recognition activities. The described recognition results section of the data structure may be used to store recognition results on a plurality of levels. Therefore, it is particularly well suited for use as standardized architecture since there is ample room to facilitate recognition results even as the power of available recognition engines improves. In another preferred embodiment, each representation zone includes an indicia identifying the format of the data stored in its associated zone and an indicia indicative of the amount of memory used to store the associated representation.

In another preferred embodiment, a seed value is provided that is uniquely altered each time that a datum is added to or removed from the data list. This is provided so that it can be determined whether any changes have been made to the data list since any particular application program or recognition engine processed the data list.

BRIEF DESCRIPTION OF THE DRAWINGS

FIG. 9 is a diagrammatic representation of an array suitable for storing trellis link based recognition results;

FIG. 10 is a diagrammatic representation of an array suitable for storing trellis node based recognition results.

DETAILED DESCRIPTION OF THE PREFERRED EMBODIMENTS

The present invention is well suited for use in stylus based computer systems such as the pen-based and pen-aware systems that are currently popular. Accordingly, it will be described in that context. However, it should be appreciated that the invention applies equally well to voice activated computer systems in which speech recognition is required.

Figure 2:
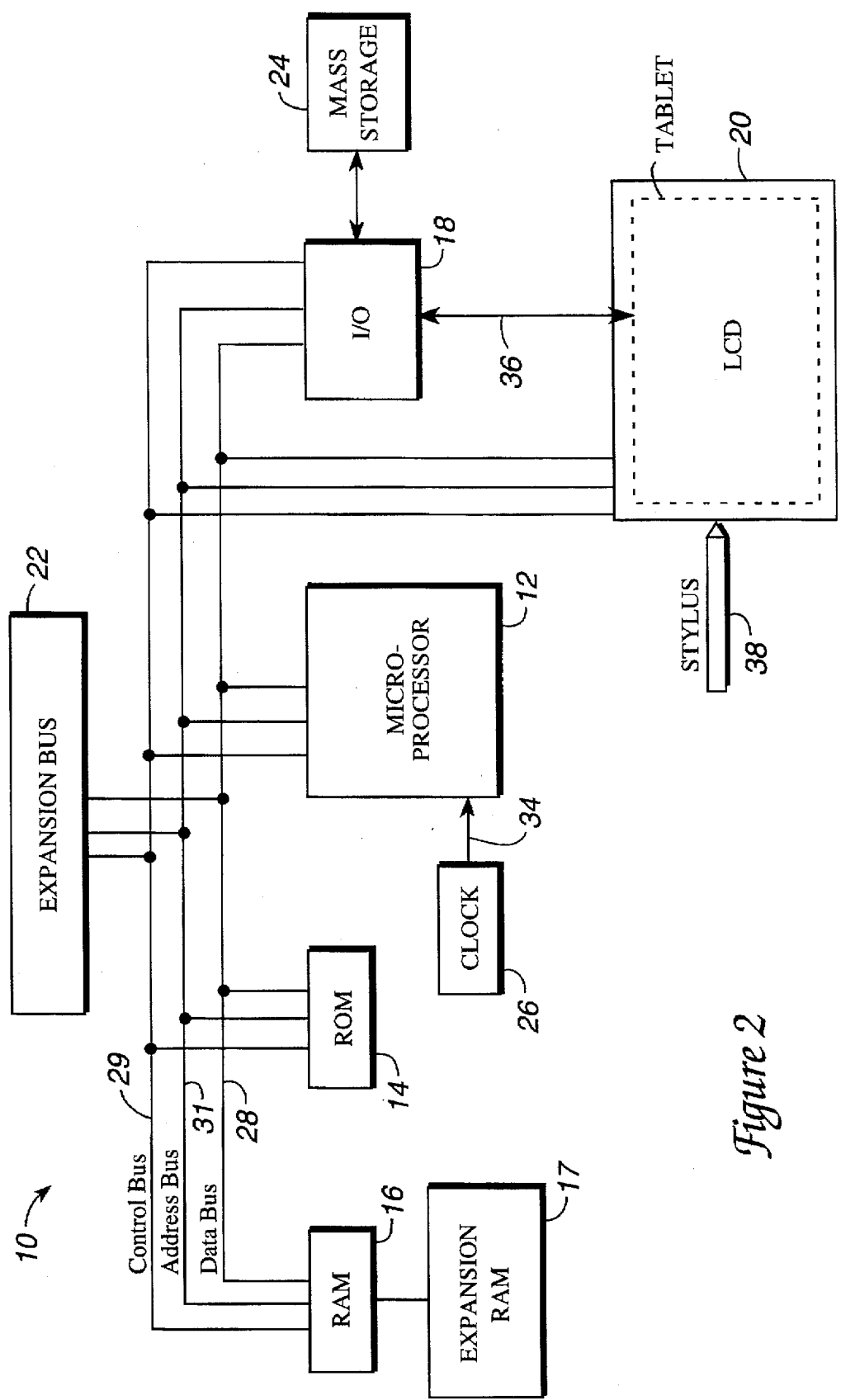
FIG. 2 is a block diagram of a pen computer system suitable for incorporating the present invention.

As shown in FIG. 2, a representative pen computer system 10 suitable for implementing the present invention includes a central processing unit (CPU) 12, read only memory (ROM) 14, random access memory (RAM) 16, expansion RAM 17, input/output (I/O) circuitry 18, display assembly 20, and expansion bus 22. Some type of mass storage 24 is generally considered desirable. However, the mass storage 24 can be eliminated by providing a sufficient amount of RAM 16 and expansion RAM 17 to store user application programs and data. In that case, RAMs 16 and 17 could be provided with a backup battery to prevent the loss of data even when the pen computer system 10 is turned off. However, it is generally desirable to have some type of long term storage 24 such as a commercially available miniature hard disk drive, nonvolatile memory such as flash memory, battery backed RAM, PC-data cards, or the like.

The CPU 12 is preferably a commercially available, single chip microprocessor. By way of example, a suitable microprocessor is the 68040 microprocessor available from Motorola, Inc. CPU 12 is coupled to ROM 14 by a data bus 28, control bus 29, and address bus 31. ROM 14 contains the basic operating system for the pen computer system 10. CPU 12 is also connected to RAM 16 by busses 28, 29, and 31 to permit the use of RAM 16 as scratch pad memory. Expansion RAM 17 is optionally coupled to RAM 16 1 0 for use by CPU 12. CPU 12 is also coupled to the I/O circuitry 18 by data bus 28, control bus 29, and address bus 31 to permit data transfers with peripheral devices.

I/O circuitry 18 typically includes a number of latches, registers and direct memory access (DMA) controllers. The purpose of I/O circuitry 18 is to provide an interface between CPU 12 and such peripheral devices as display assembly 20 and mass storage 24.

Display assembly 20 of pen-based computer system 10 is both an input and an output device. Accordingly, it is coupled to I/O circuitry 18 by a bi-directional data bus 36.

When operating as an output device, the display assembly 20 receives data from I/O circuitry 18 via bus 36 and displays that data on a suitable screen. The screen for display assembly 20 is preferably a liquid crystal display (LCD) of the type commercially available from a variety of manufacturers. The input device of display assembly 20 can be a thin, clear membrane which covers the LCD display and which is sensitive to the position of a stylus 38 on its surface. Alternatively, the screens can be provided with an embedded RF digitizer and an "active" RF stylus. There are also other suitable types of confirmation screen/tablet technologies. Combination display assemblies such as display assembly 20 are available from a variety of vendors.

In operation, information is input into the pen computer system 10 by "writing" on the screen of display assembly 20 with the stylus 38. Information concerning the location of the stylus 38 on the screen of the display assembly 20 is input into the CPU 12 via I/O circuitry 18. Typically, this information comprises the Cartesian (i.e. x & y) coordinates of a pixel of the screen of display assembly 20 over which the tip of the stylus is positioned. Commercially available combination display assemblies include appropriate circuitry to provide the stylus location information as digitally encoded data to the I/O circuitry of the present invention. The CPU 12 then processes the data under control of an operating system, and possible an application program and/or one or more recognition engines stored in ROM 14 and/or RAM 16. The CPU 12 then produces data which is output to the display assembly 20 to produce appropriate images on its screen.

Expansion bus 22 is coupled to the data bus 28, the control bus 29, and the address bus 31, similar to the other components in system 10. Expansion bus 22 provides extra ports to couple devices such as modems, display switches, microphone, speaker, etc. to the CPU 12.

Figure 3:
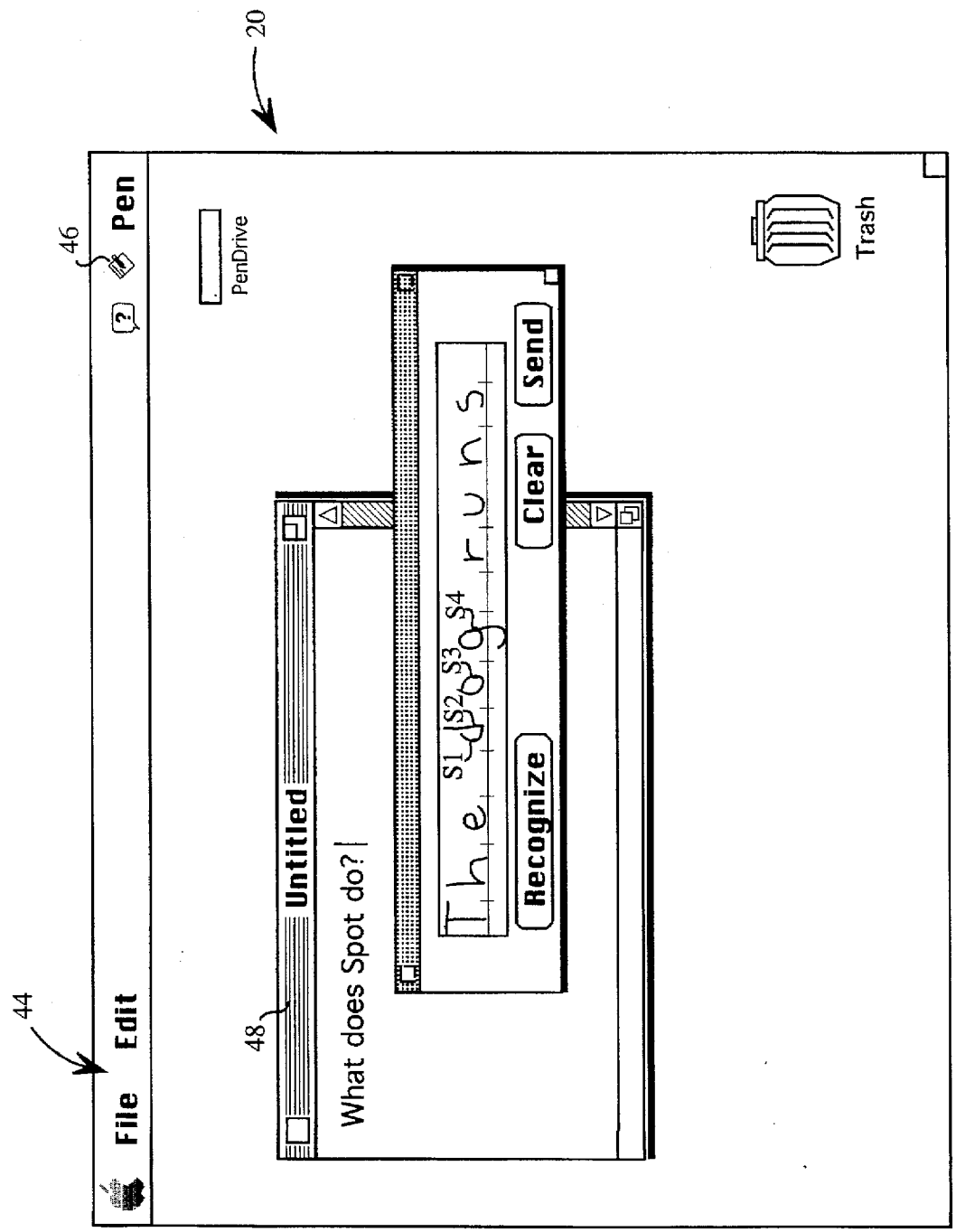
FIG. 3 is a display screen of the computer system of FIG. 2 with handwritten text entered thereon before recognition occurs.

In FIG. 3, a display screen 20 of a computer system is shown. In the described embodiment, screen 20 is the LCD input/output display of the pen computer system shown in FIG. 2. A display from an Apple Macintosh System 7.0 operating system environment is shown as an example; however, any graphical user interface (GUI) used on a computer capable of running such an environment is applicable to the present invention.

Menu titles 44, when touched with a pointing device, will display pull-down menus, which include selections that can be activated with the pointing device. Icon 46 indicates which application program in memory is currently "active".

Window 48 is displayed by a currently active application program. A window, such as window 48, may be moved on the screen, erased ("closed"), or resized at the user's convenience, as is well-known to those skilled in the art. In FIG. 3, window 48 is displayed from a word processing application program, Teach Text, in which text files may be input, output, or edited. As referenced herein, "application program" refers to programs such as word processors, spreadsheets, drawing programs, etc. that can run under a GUI environment.

Icon 46 indicates that Teach Text is the currently active application program. Herein, an "active" application program is one whose open window can be manipulated, edited, moved, etc. For example, a word processing program window, such as window 48, is active if the text that the word processor window displays can be changed or edited; the active word processing window can also be dragged, resized, or closed by clicking on specific areas of the window. In contrast, non-active program windows cannot be manipulated unless they are made active (usually by clicking on them or selecting them from a menu). A non-active window does not display an icon 46. In the described embodiment, only one program window may be active at once, although alternate embodiments can support multiple active windows, where one of the active windows is designated as the "input" window.

The communication between the operating system and the application program and/or recognition engine is intended to be relatively low level. That is, in essence, the application program will receive raw data inputted by the user. This raw data together with some basic constraints and segmentation information is then passed to the operating system, which selects an appropriate recognition engine and passes the received information directly to the recognizer. The recognition engine then attempts to identify the received information and returns the results of the recognition to the operating system which in turn passes the results back to the application program. This process is shown in somewhat more detail in FIG. 4.

Figure 4:
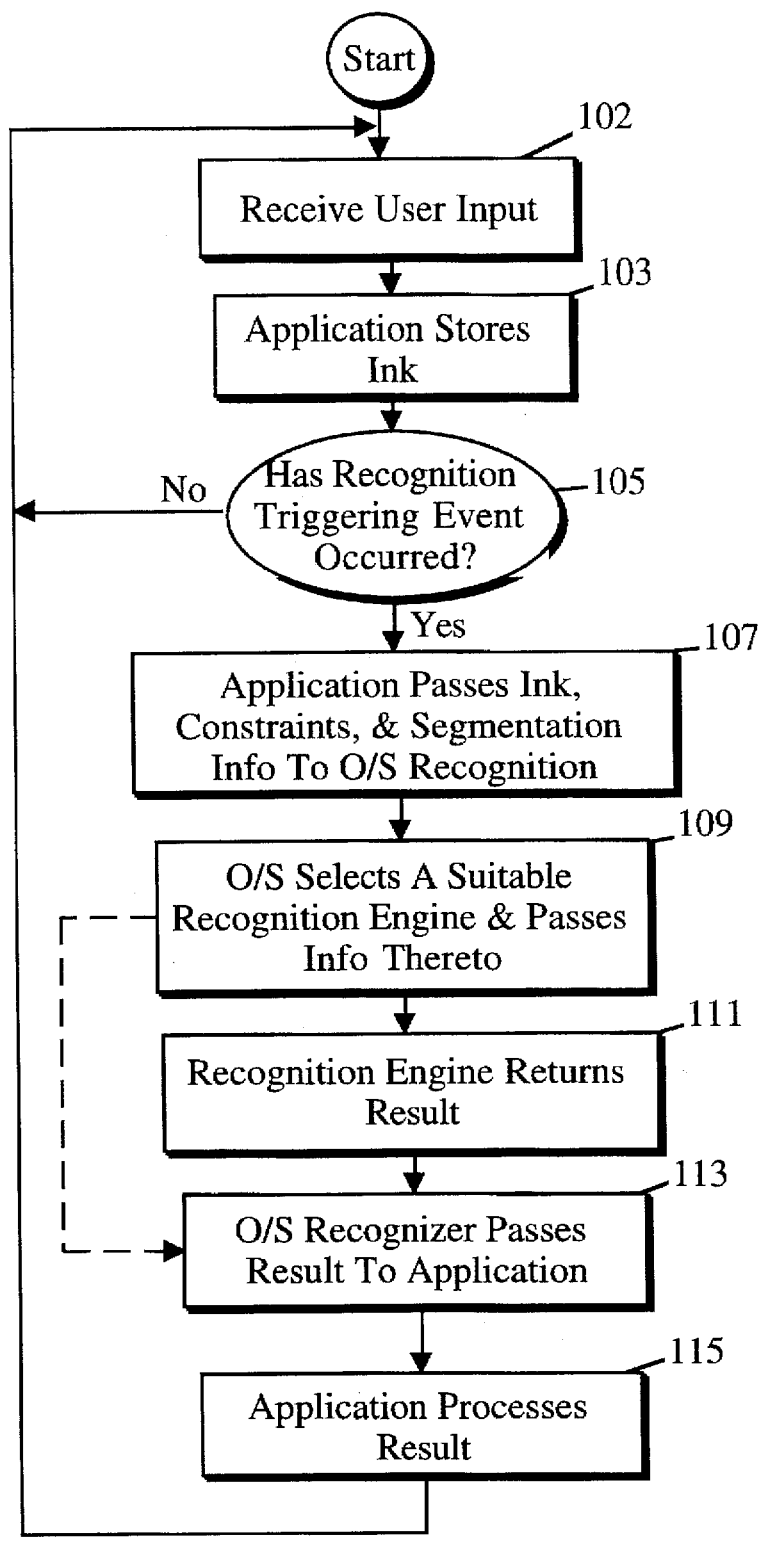
FIG. 4 is a flow diagram illustrating a method of recognizing inputted handwriting using the described computer system.

Referring next to FIG. 4, a method of recognizing a user input in a manner suitable for utilizing a data structure in accordance with the present will be described. The process begins in step 102 when the user writes on the digitizer screen of display assembly 20 using the stylus 38. This writing initiates the "inking" process described above. Then, in step 103, the application program stores the stroke information in memory. More particularly, the stroke information is stored in a data list 80 that has a structure as will be described below with respect to FIG. 6. The initial information that is stored by the application program in step 103 may vary widely from application to application. By way of example, one suitable way to store information is on a stroke basis, with each stroke being characterized as a set of continuous points (dots) which define the stroke. A second (and complementary) way to store the results is to define a rectilinear bounding box that bounds the stroke.

After the stroke information has been stored in step 103, the logic proceeds to step 105 where it determines whether a recognition triggering event has occurred. Again, the nature of the recognition triggering event may be varied widely from application to application. By way of example, the triggering event may be when a stroke is completed. Alternatively, when a combbox layout is used, the triggering event may be when the user moves on to the next space in the combbox. If no triggering event has occurred, the logic returns to step 102 and then step 103 where it receives and stores any additional user inputs. When a triggering event occurs, the logic moves to step 107 where the application program passes the stroke information, as well as any basic constraints and segmentation information to the operating system. The constraints include any indications of the expected results. By way of example, if the system is expecting a telephone number to be input, then a constraint might be the expectation on numbers in a particular (telephone style) format. If all capital letters are expected, then that expectation would be a constraint. Of course, the constraints may widely vary in accordance with the particular environment. The segmentation information may also vary widely in accordance with the particular application. By way of example, when a combbox is used, the boxes themselves may provide segmentation information. Other segmentation information may come in the form of the position on the screen of lines used as guides.

Once the operating system receives information to be recognized, it selects a suitable recognition engine in step 109 and passes the information to be recognized to the selected engine. The operating system communicates with the recognition engine with a well-defined interface. The recognition engine can be implemented as several components directed by a "controller" component that forms a part of the recognition engine. In such a case, the choice of recognition engines will depend on a variety of factors, and in essence, the operating system will attempt to choose the recognizer that is best suited to recognize the particular information that has been received. This allows the recognition engine to make a variety of services available, such as linguistic models, dictionaries, syntactic analyzers, etc.

After receiving information from the operating system, the recognition engine processes the information in step 111 and returns the results of its recognition efforts. It is left up to the recognition engine to internally decompose and process the data received.

Figure 1:
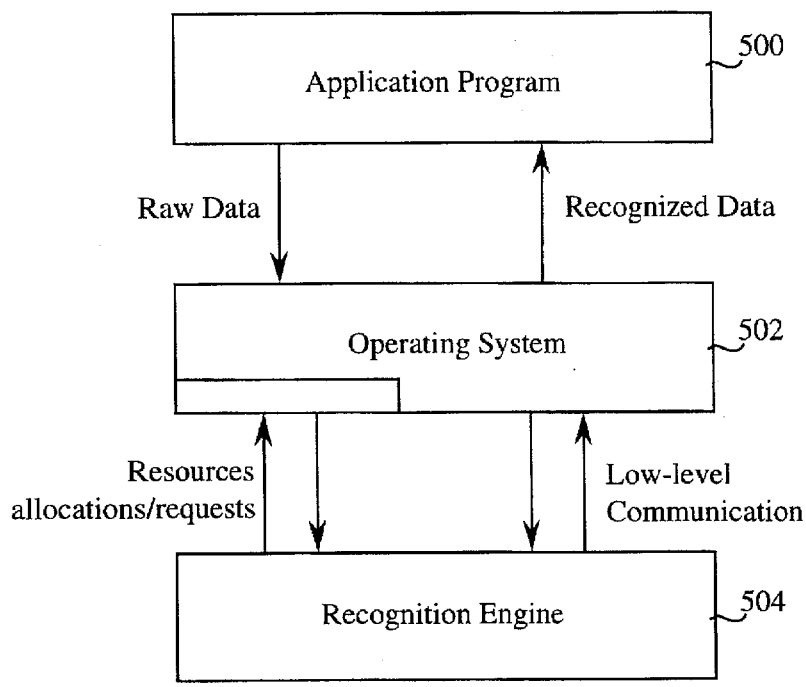
FIG. 1 is a block diagram illustrating a generic recognition architecture for a computer system.
Figure 5:
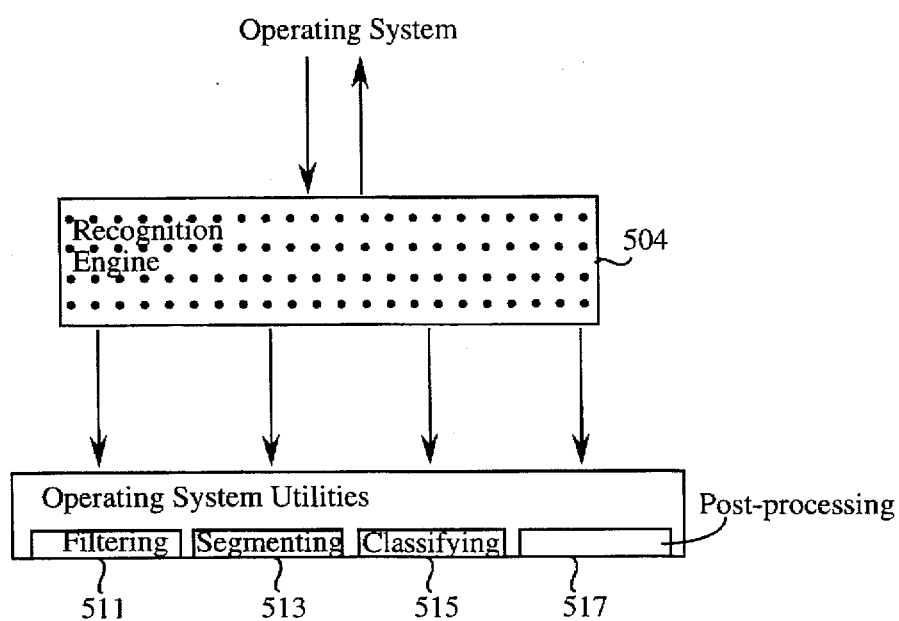
FIG. 5 is a block diagram illustrating representative utilities that the operating system can provide to recognition engines in a system incorporating the architecture illustrated in FIG. 1.

Thus, the operating system's recognition architecture does not make any requirements regarding the internal processing of the recognition engine. In many instances, the recognition engine may determine more than one potential interpretation. Accordingly, in the present invention a trellis based recognition data structure is provided for returning the results. The trellis based structure is particularly well suited for returning a ambiguous recognition result wherein multiple results are possible. The operating system may optionally be arranged to provide some specialized services to the recognition engine. By way of example, as illustrated in FIG. 5, the operating system could offer generalized filtering services 511, segmenting services 513, classifying services 515 and various post processing capabilities 517 to all of the recognition engines. By providing some standardized services at the operating system level, the various recognition engines can each be more compact while retaining their versatility.

Once the operating system receives the results from the recognition engine, they are passed back to the application program in step 113. The application program then processes the results as necessary and returns to step 102 where it awaits the next user input. The application level processing may be as simple as displaying the results or may include prompting editing choices etc.

To facilitate the described process and to maximize flexibility, two complementary data structures are provided that cooperate to act as the vehicle for passing information back and forth between the various levels. The first is a data list, which is a multi-representational data structure representing a list of datum such as strokes or speech utterances. The multi-representational data list has the capacity to store data indicative of the information to be recognized in multiple forms. Within each data list, data are referred to by the datum's reference number. The datum ID number uniquely identifies its associated datum. The second data structure is a trellis based recognition results section which is intended to store data indicative of the results of the recognition process. The multi-representational data list is arranged to permit multiple "representations" of the data. For example, a datum can represent a stroke as an array of Cartesian coordinates or as an array of polar coordinates. The datum can be compressed without loss, compressed with a minimal loss, or not compressed at all. Each datum can embody multiple representations. The amount of information within each datum may be varied in accordance with the application program creating the data. However, it is best that the datum be relatively simple in nature. By way of example, each datum may take the form of a single stroke. Alternatively, when the information to be recognized is partitioned in a particular way, the datum may include the information within a particular partition.

Figure 6:
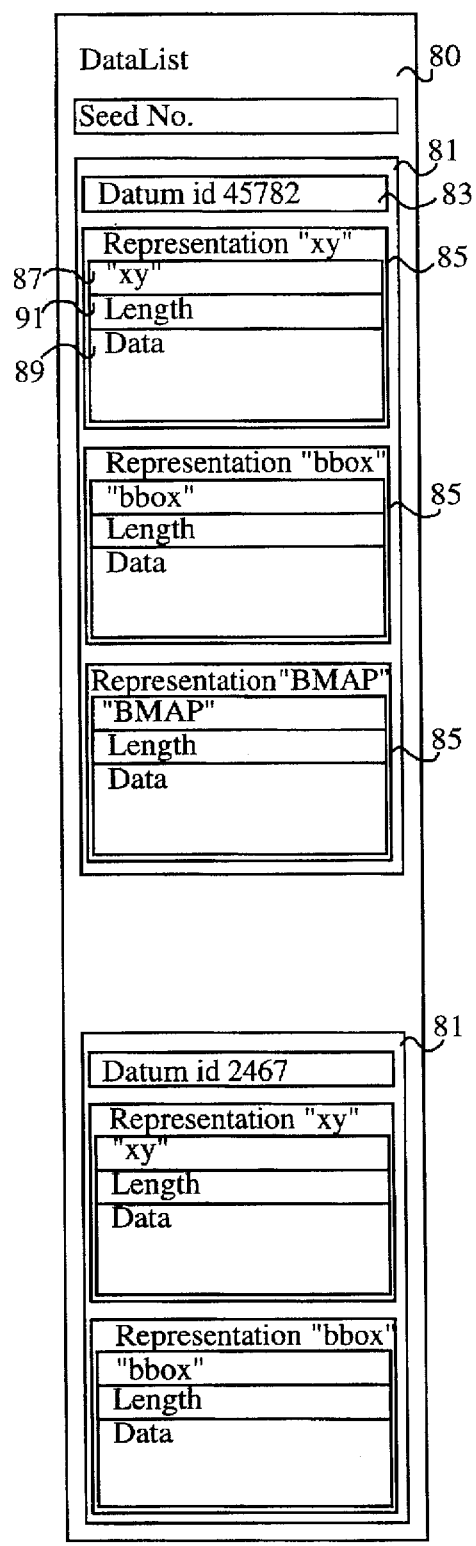
FIG. 6 is a diagrammatic representation of a data list in accordance with the present invention.

Referring next to FIG. 6, the multi-representational data structure will be described in more detail. As seen therein, the data list 80 has a plurality of datum 81, each of which describes a unique unit of data. For the purpose of simplicity, in the described embodiment, each datum represents a single stroke. Each datum 81 includes a datum ID number 83 and one or more representation zones 85. In the described embodiment, the datum ID number 83 is a 32-bit quantity that uniquely identifies a datum from its creation to its destruction. Datum reference numbers are sequentially assigned when a datum is added to the data list and are never reused. Each representation zone describes the stroke in a unique manner. The representation zones 85 each include an identifying label 87 that indicates the type of representation, a bulk data segment 89 that includes the bulk data representing the datum and a length indicator 91 that indicates the amount of memory that is occupied by the bulk data 89. By way of example, one representation of a stroke may be to consider it an array of raw digitizer coordinates (labeled "Representation 'xy'" in the drawings). That is, it simply lists the coordinates of the points that make up the stroke.

Another representation may be the bounding box that represents the rectilinear boundaries of the stroke (labeled "Representation 'bbox'" in the drawings). In this case, the coordinates of diagonal corners of the bounding box may be used to define the bounding box. A third representation may be an array of filtered digitizer coordinates. A fourth representation may be a bit mapping of the stroke (labeled "Representation 'BMAP'" in the drawings). Other representations may be used to define the stroke in any other suitable manner as determined by the application programmer. For example compressed stroke information may be stored in which duplicate points are removed. Of course, a wide variety of other representations could be provided as well. With the described data structure, the application program may be used to fill any number of representation zones. Some application programs may chose to present the data only in their unfiltered state, while others may wish to do some pre-processing of the stroke information.

The data list also includes a seed number 84. The seed number is a data list that is changed each time a datum is added to or removed from the data list. In the preferred embodiment, the contents of a datum are never changed once the datum is added to the data list. However, alternative representations may always be added and datum that are no longer useful may be eliminated. In the described embodiment, the seed number is a 32-bit value. When a recognition engine receives a data list, it can start working on it immediately. It may later be called again with the same data list, although certain data may be added or removed. Such modifications to the data list will be indicated by a seed number. If the data list has changed the recognition engine can change the results accordingly.

The second data structure is used to present the recognition results. The output of the recognition engine is arranged to take the form of a decorated trellis. This structure represents a segmentation of the strokes and the results of the recognition. Ambiguous segmentation and ambiguous recognition can be represented using such trellis based structures. The trellis can be arranged in one of two ways. In the first arrangement, information is attached to the links of the trellis as shown in the representative trellis of Fig. 7(a). In an alternative arrangement, the information may be attached to the nodes as shown in the representative trellis of FIG. 7(b). These representation approaches are complementary and can be used in parallel to represent different levels of recognition results. This is advantageous since as will be appreciated by those familiar with linguistics, link based trellises are best for diagramming some types of recognition results, while node based trellises are best for diagramming other types of recognition results.

More specifically, in a first arrangement, the links of the trellis represent possible transitions from one state to another and are decorated with a label (a string) and a score (a transition probability). That is, each link has a score representing the probability that that link is correct. There can be several levels of links representing different levels of analysis. The lowest level contains information about the data whereas the highest level contains the results of the recognition for the whole data list. In an alternative arrangement, the labels and scores are attached to the trellis nodes. In still other arrangements, information could be attached to both the links and nodes. For example, when information the labels are attached to the nodes, probability information, or information about the type of links that are made could be attached tot he links, and vice versa.

Figure 7A:
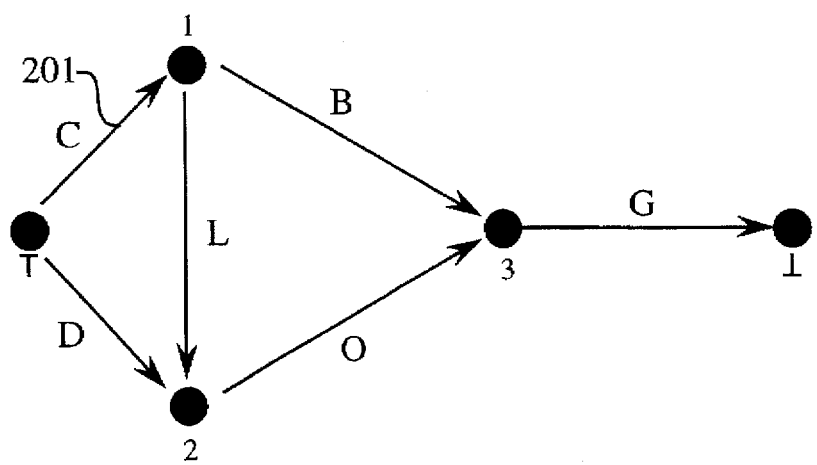
FIG. 7(a) is a representation of a link based character recognition result trellis diagramming the center word written in the screen shown in FIG. 3.

The organization of the trellis based recognition results will be explained with reference to FIGS. 3 and 7–10. For the purposes of explanation, consider the input "the dog runs" which is written by the stylus 38 on the screen 20 as seen in FIG. 3. To write the word "dog", a user may use four strokes, marked S1–S4 in the drawings. These strokes can be interpreted in several ways as best illustrated in FIG. 7(a). More specifically, the relational position of the second stroke is not clear. It may be an independent letter (i.e. the letter "l"), it may be combined with the first stroke to create a letter (i.e. the letter "d") or it may be combined with the third stroke to create a letter (i.e. the letter "b"). Thus, looking at the writing itself, there are three logical ways to interpret the writing. They include the letters "cbg", the letters "clog", and the letters "dog". These potential interpretations are diagrammed in FIG. 7(a) using a trellis structure wherein the links are labeled with information.

The recognition results data structure is arranged to store this information in the array 200 seen in FIG. 9. Within the array 200, each of the links of the recognition trellis is identified and described. More specifically, each row of the array refers to a different link. The first column 210 identifies the beginning node of the link. The second column 211 identifies the second node of the link. The third column 212 is intended to store the label applied to the link. However, in order to maximize flexibility, rather than storing the labeling information directly, this column stores pointers, which point to the section of memory which stores the label information. The advantage of this approach is that the labels can be of any length. When recognition is on a character basis, this may not be particularly important. However, such a pointer structure provides good versatility to handle recognition results on any scale (including, for example, sentence or paragraph based recognition). A fourth column 213 may optionally include a fourth column which holds an estimate of the probability that the associated label is the correct reading.

Referring specifically to FIG. 9, the first row 201 in the array 200 refers to the link between the beginning node "" and node #1. This represents the possibility that the first stroke is the letter "c" which is the label placed in the label column 212. The second row 202 in the table refers to the link between the first and second nodes. This represents the possibility that the second stroke is the letter "l". The third row 203 refers to the link between the second and third nodes. This represents the possibility that the third stroke is the letter "o". The fourth row 204 refers to the link between the third node and the ending node "⊥". This represents the possibility that the fourth stroke is the letter "g". In the described interpretation, there are no alternatives to the interpretation of the fourth stroke. However, the interpretation of the first three strokes are subject to some ambiguity. Specifically, the first two strokes may be intended to combine to form the letter "d". This possibility is represented by the link 205 between the beginning node "" and the second node. Similarly, the second and thirds strokes may be intended to combine to form the letter "b". This possibility is represented by link 206 between the first and third nodes.

When sophisticated recognition engines are used, it may be desirable to also include information concerning the probability of each link being correct. Thus, the fourth column of the data structure may also optionally be filled in to indicate the probability that each link is correct.

Figure 7B:
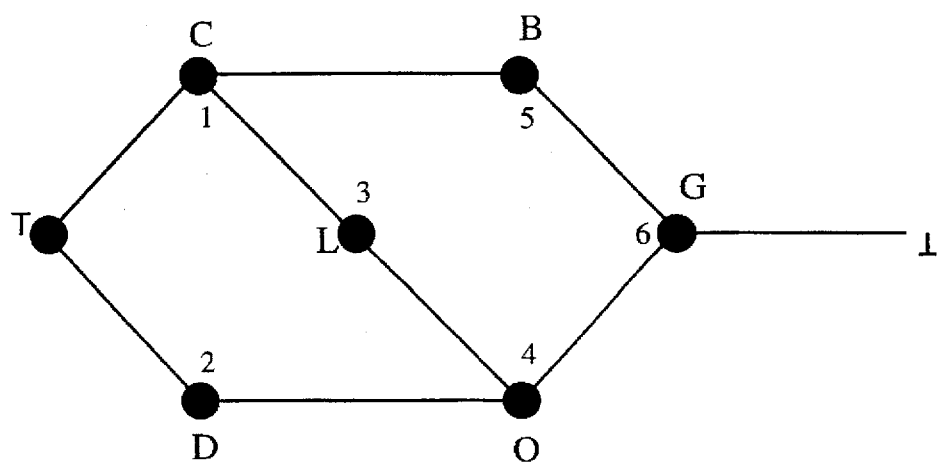
FIG. 7(b) is a representation of a node based character recognition result trellis diagramming the same word as diagrammed in FIG. 7(a)

The same information can also be represented in node based trellis structure as shown in FIG. 7(b). In the node based trellis structure, the information is attached to the nodes rather than to the links between the nodes. Accordingly, an array suitable for housing the node based trellis structure is shown in FIG. 10. The array 220 includes a first column 221 that indicates the node number and a second column 223 that contains pointers to the memory that stores the label associated with the node. Pointers are used for the same reason as discussed above with respect to the link based trellis representing array.

In the example shown, node #1 represents the possibility that the first stroke is a "c". Node #2 represents the possibility that the first and second strokes combine to form the letter "d". Node #3 represents the possibility that the second stroke is the independent letter "l". Node #4 represents the possibility that the third stroke is the letter "o". Node #5 represents the possibility that the second and third strokes are intended to be combined to form the letter "b" and node #6 represents the probability that the fourth stroke is the letter "g". As will be appreciated by those skilled in the art, either the node or the link based trellis structures may be used to represent recognized information. In some cases the node based structure will be more efficient, while in other cases the link based structure will be more efficient. Therefore, the data structure is adapted to facilitate both.

Figure 8:
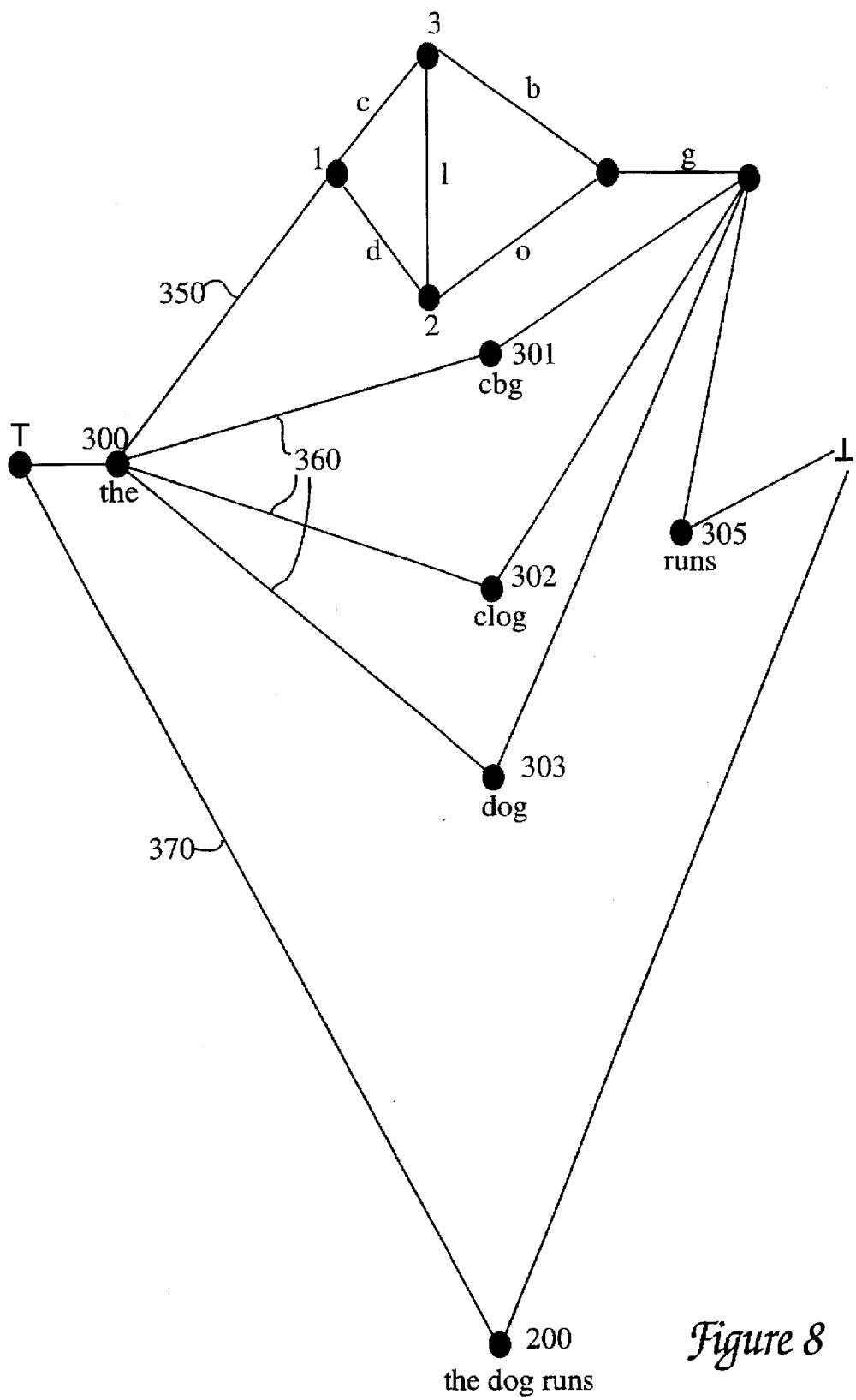
FIG. 8 is representation of a multi-level recognition results trellis.

As will be described with reference to FIG. 8, the recognition results data structure is designed to permit the storage of recognition results on multiple levels. As seen in FIG. 8, path 350 represents recognition on a character level. That is, the character based recognition result discussed above with reference to FIGS. 7(a) & 7(b). Paths 360 form a node based trellis that represent recognition on a word level. Thus, nodes 301, 302 and 303 represent potential words that can be discerned from the character based recognition result. The three potential interpretations are the acronym "cbg" (node 301), the word "clog" (node 302) and the word "dog" (node 303). In the example, it is presumed that the words "the"—(node 300) and "runs" (node 305) are determined to have only one potential reading. Path 370 represents recognition on the sentence level. Specifically, when recognized on the sentence level, only the phrase "the dog runs" is deemed appropriate since neither the phrase "the cbg runs" nor the phrase "the clog runs" make much sense. It should be apparent that the described trellis representing array structures are very well suited to handling recognition on these higher levels as well since the labeling column utilizes pointers and therefore, as much memory as is necessary can be used to label a particular node or link. FIG. 8 also emphasizes the advantage of using data structures that permit trellis representations that attach labels to either the nodes or the links depending upon which representation is desired for a particular application. For example, in the embodiment shown in FIG. 8, the character based recognition result is modeled on a link based trellis while the word and sentence based recognition results are modeled on node based trellises.

The described architecture has the advantage of being highly modular making it simple and easy to maintain. It is intended to be suitable for used with a wide diversity of application programs and recognition engines. Various applications programs and recognition engines that use the described structure may represent the input data and/or characterize the recognition results in a variety of manners using the described data structure. Accordingly, the architecture is well suited for continuing use as the power of the recognition engines used by the computer system increase in the future.

Although only one embodiment of the present invention has been described in detail, it should be understood that the present invention may be embodied in other specific forms without departing from the spirit or scope of the invention. For example, although the invention has been primarily described with reference to handwriting recognition systems, it is equally suitable for use in speech recognition applications. Further, the described data formats for stroke description and are representative in nature only. Accordingly, other formats may be generated by the application program and the described formats may be either used or eliminated depending upon the requirements of a particular application program. Similarly, the recognition results may be modeled on any level that is suitable for presenting the results of a particular recognition activity or recognition engine. Therefore, the present examples are to be considered as illustrative and not restrictive, and the invention is not to be limited to the details given herein, but may be modified within the scope of the appended claims.

What is claimed is:

1. A computer-readable media having a recognition data structure suitable for use in a computer system having recognition abilities, the data structure comprising:

a multi-representational data list section arranged to store a multiplicity of datum, wherein each datum includes a datum reference number that uniquely identifies that datum, and is arranged to contain a plurality of representation zones, each representation zone being arranged to hold data indicative of a particular representation of the data stored in the datum, wherein said multiplicity of datum represents information relating to speech or stroke inputs provided to said computer system and available for recognition use by said computer system via said recognition abilities; and a recognition results section arranged to accommodate recognition results at a plurality of different levels, wherein said recognition results are generated and provided by said recognition abilities within said computer system following recognition of said multiplicity of datum.

2. A computer-readable media having a recognition data structure as recited in claim 1 wherein the recognition results section is a trellis based recognition results structure that includes an array which identifies each link in the trellis and a label applied to that link.

3. A computer-readable media having a recognition data structure as recited in claim 2 wherein the trellis based recognition results structure further includes a second array which identifies each node in the trellis and a label applied to that node.

4. A computer-readable media having a recognition data structure as recited in claim 2 wherein the array further has storage space to identify the probability of each link being correct.

5. A computer-readable media having a recognition data structure as recited in claim 1 wherein the recognition results section is a trellis based recognition results structure that includes an array which identifies each node in the trellis and a label applied to that node.

6. A computer-readable media having a recognition data structure as recited in claim 1 wherein each datum represents a written stroke.

7. A computer-readable media having a recognition data structure as recited in claim 1 wherein each datum represents a speech utterance.

8. A computer-readable media having a recognition data structure as recited in claim 1 wherein one of the levels represents recognition on a character level.

9. A computer-readable media having a recognition data structure as recited in claim 1 wherein one of the levels represents recognition on a word level.

10. A computer-readable media having a recognition data structure as recited in claim 1 wherein one of the levels represents recognition on a sentence level.

11. A computer-readable media having a recognition data structure as recited in claim 1 wherein each zone includes an indicia identifying the format of the data stored in its associated zone and an indicia indicative of the amount of memory used to store the associated representation.

12. A computer-readable media having a recognition data structure as recited in claim 1 wherein the datum reference numbers are assigned sequentially.

13. A computer-readable media having a recognition data structure as recited in claim 1 wherein the data representations include:

a representation of a stroke in Cartesian coordinates; and a representation of the bounding box of the stroke.

14. A computer-readable media having a recognition data structure as recited in claim 13 wherein the Cartesian coordinates representation of the stroke are represented as an array of raw digitizer coordinates.

15. (Once Amended) A computer-readable media having a recognition data structure as recited in claim 13 wherein the Cartesian coordinates representation of the stroke are represented as an array of filtered digitizer coordinates.

16. A computer-readable media having a recognition data structure as recited in claim 1 wherein the data structure is arranged to pass recognition information back and forth between an application program, an operating system and a recognition engine.

17. A computer-readable media having a recognition data structure as recited in claim 1 further comprising a seed value arranged to be uniquely altered each time that a datum is added to or removed from the data list.

18. A computer-readable media having a recognition data structure as recited in claim 17 wherein the seed number is arranged to be incremented each time that data is added to or removed from the data list.

19. A computer-readable media having a recognition data structure as recited in claim 1 wherein:

the recognition results section is a trellis based recognition results structure that includes an array which identifies each information carrying component of a trellis and a label applied to that information carrying component; and each row in the array includes a label which takes the form of a pointer that points to a block in memory that stores a block of information that labels the information carrying component that defines the associated row.

20. A computer-readable media having a recognition data structure suitable for use in a computer system that is arranged to pass recognition information back and forth between an application program, an operating system and a recognition engine, the data structure comprising:

a multi-representational data list section arranged within said computer-readable media to store a multiplicity of datum, wherein each datum includes a datum reference number that uniquely identifies that datum, and is arranged to contain a plurality of representation zones, each representation zone being arranged to hold data indicative of a particular representation of the data stored in the datum, an indicia identifying the format of the data stored in its associated zone and an indicia indicative of the amount of memory used to store the associated representation, wherein said multiplicity of datum represents information relating to speech or stroke inputs that are available for use by said recognition engine; and a trellis based recognition results section arranged within said computer-readable media to contain a plurality of arrays, each array corresponding to a different trellis level and including a representation of each link or node of its associated trellis level, a label applied to the represented link or node, and an indication of the probability that the represented link or node is correct, said plurality of arrays being generated by said recognition engine following recognition of said multiplicity of datum.

21. A computer-readable media having a recognition data structure as recited in claim 20 wherein a first level of the trellis represents recognition on a character level and a second level of the trellis represents recognition on a word level.

22. A computer-readable media having a recognition data structure as recited in claim 20 further comprising a seed value arranged to be uniquely altered each time that a datum is added to or removed from the data list.

* * * * *